Patented Aug. 13, 1935

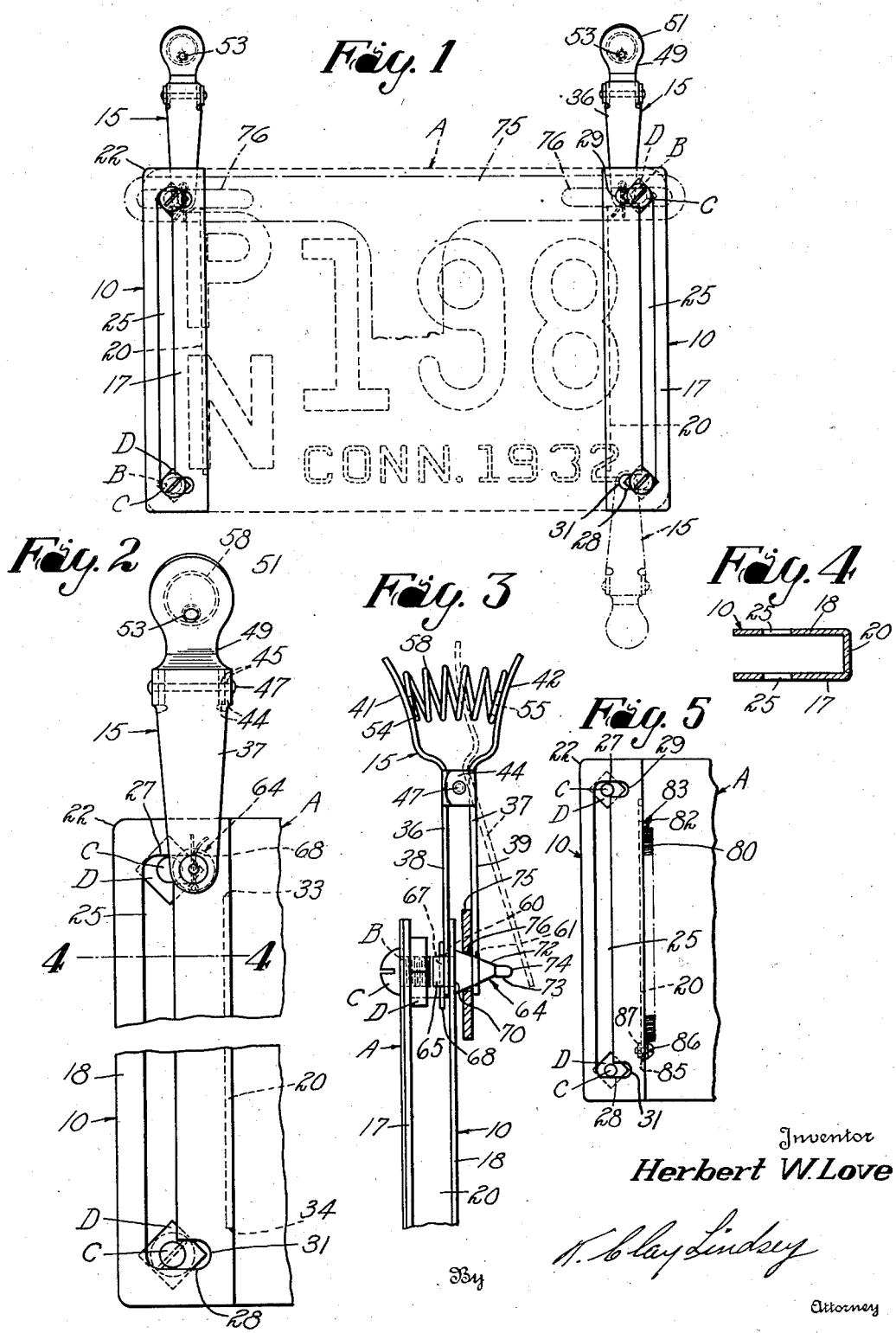

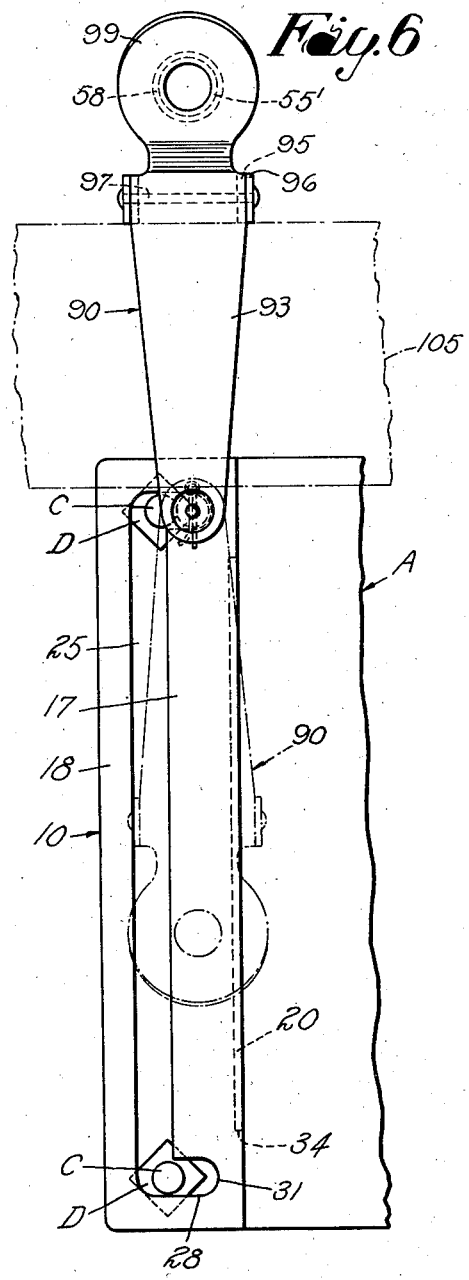
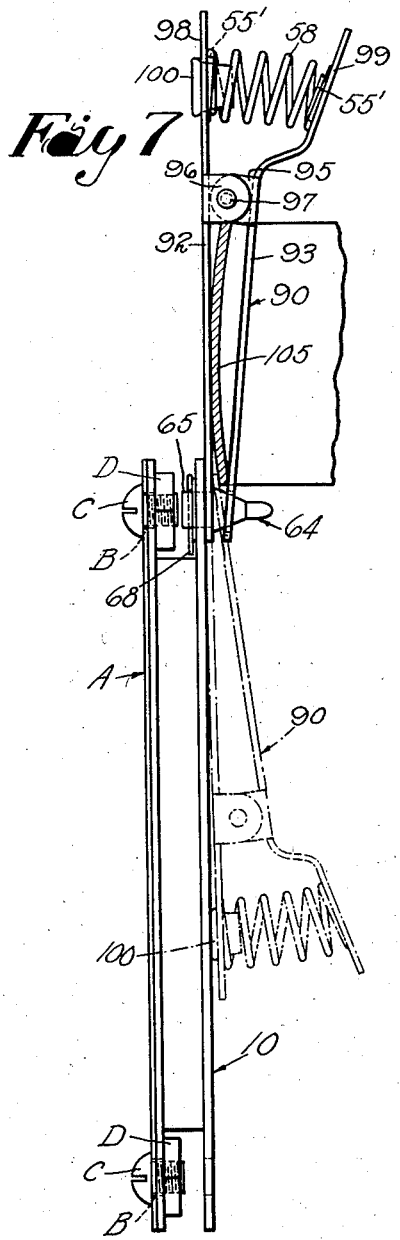

2,011,004

UNITED STATES PATENT OFFICE 2,011,004

BRACKET

Herbert W. Love, Hartford, Conn.

Application December 14, 1933, Serial No. 702,323

7 Claims. (Cl. 40—125)

This invention relates to improvements in brackets or plate holders, and has particular reference to improvements in brackets for attaching license plates or markers to automobiles.

One of the objects of the invention lies in the provision of a quick detachable bracket or plate holder by means of which a license plate or marker may be easily attached to an automobile and quickly removed therefrom.

Another object lies in the provision of a bracket that is simple and economical to manufacture and install and one that is attractive in appearance and durable in use.

An additional object lies in the provision of an attaching bracket which constitutes a reinforcing means for a license plate adapted to preserve the same against injury or distortion.

Other objects and advantages of the invention will appear as the description proceeds.

While I have illustrated in the accompanying drawings forming a part of this application a particular mechanical embodiment of the idea of the invention and a somewhat modified form thereof, it is to be understood that the drawings are for the purpose of illustration only and that the invention is to be limited solely by the scope of the subjoined claims.

In the drawings,

Fig. 1 is a vertical elevational view of my improved bracket shown attached to a conventional license plate or marker;

Fig. 2 is a fragmentary view on a somewhat enlarged scale of one unit of my bracket, as illustrated in Fig. 1;

Fig. 3 is a fragmentary elevational view of one unit of my improved bracket looking at the bracket from the left as viewed in Fig. 2;

Fig. 4 is a sectional view on the line 4—4 of Fig. 2;

Fig. 5 is an elevational view similar to Fig. 2 showing a slightly modified form of the device of the invention;

Fig. 6 is an elevational view similar to Fig. 2 showing a somewhat modified form of a device of the invention; and Fig. 7 is an end elevational view similar to Fig. 3.

Referring to the drawings in detail, in Fig. 1 I have illustrated a conventional license plate or marker A provided with holes, apertures, or slots B at the corner thereof in the usual manner to accommodate means such as the stove bolts C and nuts D for attaching the license plate or marker to the license plate supporting bar or bracket conventionally provided on automobiles. I have also shown a unit of my improved bracket comprising a standard, generally indicated at 10, and a clip, generally indicated at 15, secured to each end of the license plate A by means of the conventional bolts and nuts C and D. As each unit of my improved bracket is identical, it is believed that a description of one unit comprising a standard 10 and a clip 15 is sufficient for the purpose of this disclosure. The standard 10 comprises a member which may conveniently be formed up of sheet metal and consists of a member of U-shaped cross section, as particularly illustrated in Fig. 4, having coincident flanges 17 and 18 and a web portion 20 joining the flanges together along corresponding edges thereof. As illustrated in Figs. 1 and 2, each flange is in the form of an elongated rectangle, the corners remote from the web 20 being rounded, as indicated at 22, so that the bracket may be handled without danger of injury to the user. Each flange is provided with longitudinally extending slots 25 positioned closely adjacent to the outer edge thereof and extending to locations adjacent to each end of the flange member. At each end thereof, the slots 25 are provided with transverse extensions 27 and 28 which extend from the slots toward the edges of the flanges connected to the web 20 and terminate in rounded ends 29 and 31 adjacent to the web edges of the flanges. From an inspection of Figs. 1 and 2, it will be observed that these slots and extensions thereof are aligned and that the two standards comprising a complete bracket are similar in all respects and are readily reversible and interchangeable.

From an inspection of Figs. 2 and 3, it will also be observed that the web member 20 terminates at a location short of the ends of the standard, as indicated at 33 and 34. In the form of the device illustrated, one standard is attached to each end of a license plate or marker A by means of bolts C which extend through the apertures B in the license plate, and through the slot 25 and extensions 27 and 28 thereof and are fitted with nuts D which lie between the two flanges 17 and 18. The standards are preferably permanently secured to the license plates in this manner, although it is to be understood that they may be removed and attached to different license plates, if desired. In combination with each of the standards 10, I have provided a clip 15, particularly illustrated in Fig. 3, which comprises a pair of legs 36 and 37 having normally parallel portions 38 and 39 and normally diverging portions 41 and 42. At the junction of the straight and diverging portion of each leg, I have provided a pair of bent-over ears, as indicated at 44 in Fig. 3.

These ears lie in a plane transverse to the major surfaces of the legs and are preferably so designed that the ears formed on one leg will lie within the ears formed on the other leg. The overlapping portions of the ears 44 are pierced by registering apertures, indicated at 45, and through these apertures extends a pin or rivet 47 to provide a hinge connection between the two opposed legs of the clip. The diverging portions of the legs of the clip are transversely curved, as illustrated in Fig. 3, to form a handle or finger grip for the clip and, as particularly illustrated in Fig. 2, these diverging portions are provided with a reduced part 49 adjacent to the straight or parallel portions 38 and 39 and terminate in rounded end portions 51. Each of the rounded end portions is provided with an aperture or indentation 53 which provides a rounded boss, as indicated at 54 and 55 in Fig. 3, upon the adjacent surfaces of the diverging portions 41 and 42 of the legs 36 and 37. A coiled compression spring 58 is compressed between the two diverging portions 41 and 42 in such a manner that its ends surround the bosses 54 and 55 which serve to retain the spring in position in the clip. The spring is normally in a state of compression and tends, at all times, to force the ends of the parallel portions 38 and 39 remote from the hinge connection together. As particularly illustrated in Fig. 3, the legs 36 and 37 are provided with apertures 60 and 61 adjacent the ends of the straight portions 38 and 39 thereof, and within the aperture 60 provided in the leg 36, there is mounted an element, generally indicated at 64, which comprises a cylindrical portion 65 of a diameter to fit snugly within the aperture 60 and of a length to extend beyond the outer surface of the leg 36 and through the slot 25 in the standard 10 where it is pierced by a transverse aperture 67 through which is inserted a retainer 68, such as a cotter key, for securing the element 64 to the leg 36 of the clip and the clip to the standard. As the portion 65 is of slightly less diameter than the width of the slot 25, the clip is adjustably secured to the standard and may be moved relatively to the standard within the confines of the slot 25. This cylindrical portion terminates at one end thereof in a transverse or radial shoulder 70 having a diameter greater than the diameter of the aperture 60 and from this shoulder a frustro-conical portion 72 slopes away from the cylindrical portion 65. At the smaller end of the frustro-conical portion 72, there is a cylindrical tip portion 73 terminating in a rounded end, as indicated at 74. It will now be observed, from the illustration of Fig. 3, that by compressing the diverging portions 41 and 42 together and compressing the spring 58, the straight portion 39 of the leg 37 may be moved away from the leg 36 to a position beyond the end of the tip 73 of the element 64 to permit the clip to be inserted over the marker holding bar 75 of an automobile. When the clip is thus inserted over the bar, the tip 73 is inserted into the slot or aperture 76 conventionally provided in such a bar, and the diverging or handle portions of the clip are then released, permitting the spring to force the portion 39 of the leg 37 toward the portion 38 of the leg 36. This action will force the frustro-conical portion 72 of the element 64 into the slot or aperture provided in the plate-holding bar 75 and cause the sides of the portion 72 to bind against the sides of the slot 76 to provide a tight and rattleproof connection between my improved bracket with the attaching plate and the plate-holding bar of the automobile.

As there is a considerable amount of diversity in the plate-holding bars provided on different automobiles and even on different models of the same make of automobile, I have provided, in a somewhat modified form of the invention as illustrated in Fig. 5, means by which my improved bracket may be readily attached and detached from bars of the type not susceptible to attachment by the clips 15. In this modified form of the invention, in addition to the clips 15, I have provided an attaching means comprising a coil spring 80 located along that side of the web 20 remote from the flanges 17 and 18 of the standard 10. This spring is somewhat shorter than the standard, and is located approximately centrally thereof. As a means for attaching the spring at its ends to the standard, I have provided at the upper end of the spring a lug or tongue 82 struck out of the material of the web 20 and upturned at its outer end, as indicated at 83, to form a hook for the transversely positioned upper loop of the spring. At the lower end of the spring, I have provided an aperture 85 through the web 20 through which a bolt 86 may be inserted. This bolt is also through the lower transversely positioned loop of the spring and is secured in position by means of a nut 87. In order to attach my improved bracket to a plate-holding bar not susceptible to attachment by the clips 15, the spring 80 may be hooked or looped over the corresponding ends of the bar.

In the modified form of the invention illustrated in Figs. 6 and 7, I utilize the same standard 10 secured to the plate A in the same manner as described above. In combination with this standard, however, I have provided a modified form of spring clip generally indicated at 90. This modified form of clip is materially larger than the clip 15 and differs from the clip 15 in other important details. The clip 90 comprises a pair of legs 92 and 93 each having a handle or finger portion and a clamping portion. At the junction of the clamping portions with the finger portions, these legs 92 and 93 are provided with apertured ears, as indicated at 95 and 96, bent to extend transversely to the main portions of the legs and so dimensioned that the ears formed on one leg overlap the ears formed on the other leg, as particularly illustrated in Fig. 6. A pin or rivet 97 extends through the registering apertures provided in the ears 95 and 96 and hingedly secures the legs 92 and 93 together. Between the handle portions 98 and 99 of the respective legs 92 and 93, I have provided a compression spring 58 similar to that illustrated in Fig. 3. These handle portions are also provided with bosses 55' to maintain the spring in position between the handle portions of the clamp.

Referring to Fig. 7, it will be observed that the leg 92 of the clamp 90 is straight while the leg 93 is bent so that the handle portion 99 diverges away from the handle portion 98 of the leg 92 to provide space between these handle portions for the spring 58 and for opening the clamping portions of the clip. Within the apertures providing the boss 55' on the leg 98, I have inserted a rubber member 100 which serves to bear against the side of the bracket 10 when the clip 90 is moved to the position illustrated in dotted lines in Fig. 7 to retain the clip in this position. By referring to Fig. 7, it will also be observed that the clip 90 is secured to the standard 10 in a different manner from that utilized to secure the clip 15 to the standard 10, as in the modified construction the straight leg 92 is positioned outside of the standard 10 and the cylindrical portion 65 of the member 64 extends first through the clip and then through the standard, and the pin 68 bears against the inner side of the standard to maintain the clip in assembled relation therewith. The member 64 is the same as that illustrated in Fig. 3 and described above. One advantage derived from my modified form of clip is the fact that such a clip may be folded to a position entirely behind the standards 10 and plate A, as indicated in dotted lines in Figs. 6 and 7, to provide a better appearance for my improved marker, and a further advantage lies in the fact that these clips are of sufficient size to fit over a bumper bar, as indicated at 105, or other structural part of the vehicle on which it is desired to use the license plate or marker.

While I have illustrated and described a particular mechanical embodiment of the idea of the invention, it is to be understood that the invention is not to be limited thereby, but the scope thereof is to be measured entirely by the scope of the appended claims.

Having now described my invention so that others skilled in the art may clearly understand the same, what I desire to secure by Letters Patent is as follows.

I claim as my invention:

1. A bracket for attaching an article to a support comprising, a standard having an elongated slot therein adapted to be rigidly secured to said article, and a spring clip secured to said standard to be adjustably positioned along said slot and adapted to releasably secure said standard to said support.

2. A bracket for attaching a license plate to a support comprising a standard having an aperture therein, and a spring clip having a pair of pivoted legs provided adjacent their free ends with aligned openings, a spring urging said legs towards each other, a pin member having one end extending through the opening in one of said legs and through the aperture in said standard, means for securing said pin member in said last mentioned opening, the other end of said pin member being adapted to extend through the support and extending through the opening in the other leg to secure said bracket to said support.

3. A bracket for attaching an article to a support comprising, a standard having an elongated slot therein, a spring clip, and a member on said clip having a portion extending through and movable in said slot for adjustably securing said clip to said bracket.

4. A bracket for attaching an article to a support comprising, a standard having two aligned slots therein, a spring clip, and a member on said clip extending at one end through one of said slots to adjustably secure said clip to said standard and adapted to extend at the other end through a support to secure said bracket to said support, and means extending through the other of said slots to rigidly secure said article to said standard.

5. A license plate holder for detachably securing a license plate to a license plate support comprising, an elongated standard adapted to be rigidly secured to said license plate and provided with an elongated slot therein, a spring clip having registering apertures in the extremity of the legs thereof, and a member extending through one of said apertures and through said slot for adjustably securing said spring clip to said standard, said member being adapted to extend through said license plate support to detachably secure said license plate and said bracket to said license plate support.

6. A license plate holder for detachably securing a license plate to a license plate support comprising, an elongated standard adapted to be rigidly secured to said license plate and provided with an elongated slot therein, a spring clip having registering apertures in the extremity of the legs thereof, a member having a cylindrical portion extending through one of said apertures and through said slot for adjustably securing said spring clip to said standard, and a conical portion adapted to extend through said support to detachably secure said license plate and said bracket to said support against relative movement of vibration therebetween.

7. A spring clip comprising a pair of legs having parallel portions and diverging portions, a hinge connection between said legs at the junction of said parallel portions with said diverging portions, a coiled compression spring between said diverging portions, means comprising bosses formed in said diverging portions to retain said spring between said portions, a pair of registering apertures in the extremities of said parallel portions, and a member mounted in one of said apertures and having a portion adapted to extend through the other of said apertures.

HERBERT W. LOVE.